US009171230B2

United States Patent
Jiang et al.

(10) Patent No.: US 9,171,230 B2
(45) Date of Patent: Oct. 27, 2015

(54) OBJECT DETECTION METHOD, OBJECT DETECTION APPARATUS AND IMAGE PICKUP APPARATUS

(71) Applicant: CANON KABUSHIKI KAISHA, Tokyo (JP)

(72) Inventors: Yong Jiang, Beijing (CN); Lifeng Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/107,436

(22) Filed: Dec. 16, 2013

(65) Prior Publication Data
US 2014/0176752 A1    Jun. 26, 2014

(30) Foreign Application Priority Data
Dec. 18, 2012  (CN) .......................... 2012 1 0550321

(51) Int. Cl.
*G06K 9/62* (2006.01)
*G06K 9/68* (2006.01)
*G06K 9/00* (2006.01)

(52) U.S. Cl.
CPC .......... *G06K 9/6217* (2013.01); *G06K 9/00281* (2013.01); *G06K 9/00362* (2013.01); *G06K 9/628* (2013.01); *G06K 9/6857* (2013.01)

(58) Field of Classification Search
USPC ........................... 382/159, 160, 170, 224–228
See application file for complete search history.

(56) References Cited

U.S. PATENT DOCUMENTS

| 7,551,755 | B1 | 6/2009 | Steinberg et al. |
| 7,555,148 | B1 | 6/2009 | Steinberg et al. |
| 7,558,408 | B1 | 7/2009 | Steinberg et al. |
| 2006/0104494 | A1* | 5/2006 | Collins et al. .................. 382/128 |
| 2007/0196013 | A1* | 8/2007 | Li et al. .......................... 382/159 |
| 2007/0258648 | A1* | 11/2007 | Perronnin ..................... 382/224 |

(Continued)

FOREIGN PATENT DOCUMENTS

| JP | 2007-058402 A | 3/2007 |
| JP | 2008-141239 A | 6/2008 |

(Continued)

OTHER PUBLICATIONS

Naoki Akutsu et al., Article entitled "Facial-Parts Detection in Surveillance Camera Images by Using a Mobile Camera Image", Proceedings of the 2009 IEICE Counsel, Mar. 4, 2009, including Concise Explanation of Relevance.

*Primary Examiner* — Sinh Tran
*Assistant Examiner* — Shahbaz Nazrul
(74) *Attorney, Agent, or Firm* — Canon USA Inc. IP Division

(57) ABSTRACT

An object detection method performed by an apparatus which stores a general model for a specific object type in advance, the general model describing a plurality of components which are expected to co-exist in objects of the specific object type, the method including: a sample image receiving step of receiving one or more sample images, the one or more sample images each include a same query object of the specific object type; an object detector creating step of creating, using the general model and the one or more sample images, a detector specific to said query object; and an object detecting step of detecting, using the created detector specific to the query object, the query object from a destination image. According to the object detection method mentioned above, various objects of a specific object type can be precisely detected with high flexibility.

21 Claims, 12 Drawing Sheets

(56) References Cited

U.S. PATENT DOCUMENTS

| | | | |
|---|---|---|---|
| 2009/0129683 A1* | 5/2009 | Nitta | 382/227 |
| 2010/0014721 A1* | 1/2010 | Steinberg et al. | 382/118 |
| 2010/0177968 A1* | 7/2010 | Fry et al. | 382/224 |
| 2011/0103699 A1* | 5/2011 | Ke et al. | 382/209 |
| 2011/0142286 A1* | 6/2011 | Morriyama | 382/103 |
| 2012/0128206 A1* | 5/2012 | Shimada | 382/103 |
| 2012/0170856 A1* | 7/2012 | Yamaguchi | 382/224 |
| 2012/0301032 A1* | 11/2012 | Kawanishi et al. | 382/190 |

FOREIGN PATENT DOCUMENTS

| | | |
|---|---|---|
| JP | 2010-146395 A | 7/2010 |
| JP | 2011-138387 A | 7/2011 |
| WO | 2010/050334 A1 | 5/2010 |

* cited by examiner

OBJECT DETECTION METHOD, OBJECT DETECTION APPARATUS AND IMAGE PICKUP APPARATUS

BACKGROUND OF THE INVENTION

1. Field of the Invention

The present disclosure relates to an object detection method, an object detection apparatus as well as an image pickup apparatus including the object detection apparatus.

2. Description of the Related Art

Analysis of visual objects in images is important in processes of object recognition, image retrieval, image registration and the like. Such processes are involved in many application fields such as surveillance (for security), video forensics, medical image analysis for computer-aided diagnosis and the like. In particular, object recognition has attracted increasing attention due to the increasing demand for developing real-world-related systems.

In conventional object recognition methods, learning/training-based classifiers are used, for which a learning/training process of classifier parameters is indispensable. However, classifiers obtained by learning/training process using specific samples of one object (for example, a dog) may not obtain good performance on another object (for example, a cat). In order to make the classifiers obtain good performance on the other object, another learning/training process has to be newly performed using specific samples of the other object, in order to modify the classifiers from those for the one object to those for the other object. This is not flexible and takes a long time.

One method for solving the above problem is to train a general classifier for a specific type of objects (such as pets including both dogs and cats), but such a general classifier will make the precision down and detect objects about which the user is not concerned. For example, even if the user only wishes to detect a dog in an image, a cat will also be detected from the image.

Another method for solving the above problem is discussed in US patent application publication No. US2010014721A1, and US patent publication Nos. US7558408B1, US7555148B1, and US7551755B1. The method disclosed in these patent documents is to first use a general classifier for a type of objects (for example, a classifier for pets) to locate the position of a candidate object in the image, and then to use a specific classifier (for example, a classifier for a cat) to judge whether the candidate object is the exact object of interest. This method has been used in cameras. According to this method, several specific classifiers (for example, a classifier for a cat, a classifier for one dog and a classifier for another dog) can be registered in advance by the user, and the user can select one of the specific classifiers for the object to be focused on before shooting a picture. The camera can be configured to automatically focus on the object detected from the image displayed in the viewfinder.

However, the inventor found that the method disclosed in the above patent documents is also not good enough because specific objects that can be detected are still limited, and only specific objects which are registered in advance by the user can be detected.

SUMMARY OF THE INVENTION

Two steps are typically involved in object detection techniques, that is, a step of training and a step of detecting. In the step of training, a classifier is obtained by training using one or more samples of the object. And then in the step of detecting, the classifier thus obtained is used to detect the object. In order to obtain a stable and accurate classifier, a considerable amount of samples are typically necessary for the training, whereas the considerable amount of samples will lead to an increased calculation amount, which makes the training time-consuming. In a case where the classifier is needed to be trained in real-time, or in a case where the computation capability is limited (such as with an application of an embedded system), the conventional techniques could not meet the requirements. On the other hand, if the time for training the classifier is attempted to be reduced by simply reducing the number of samples, the classifier obtained by such training will not be stable enough, and will be much sensitive to factors such as attitudes of the object, illumination conditions, angles of view or the like.

Therefore, one the technical problems to be solved by the present invention is to provide a new technology for objection detection, which has flexibility and accuracy for various objects. In addition, it is also expected that this new technology has acceptable efficiency.

In order to solve at least one of the technical problems, the present invention provides an object detection method performed by an apparatus which stores a general model for a specific object type in advance, the general model describing a plurality of components which are expected to co-exist in objects of the specific object type, the method including: a sample image receiving step of receiving one or more sample images, the one or more sample images each includes a same query object of the specific object type; an object detector creating step of creating, using the general model and said one or more sample images, a detector specific to the query object; and an object detecting step of detecting, using the created detector specific to the query object, said query object from a destination image.

In addition, in order to solve the above technical problem, the present invention provides an object detection apparatus including: a general model storing unit configured for storing a general model for a specific object type in advance, the general model describing a plurality of components which are expected to co-exist in objects of the specific object type; a sample image receiving unit configured for receiving one or more sample images, the one or more sample images each includes a same query object of the specific object type; an object detector creating unit configured for creating, using the general model and the one or more sample images, a detector specific to the query object; and an object detecting unit configured for detecting, using the created detector specific to the query object, the query object from a destination image.

In addition, the present invention provides an image pickup apparatus, including: a photographical optical system; an imaging unit configured for performing imaging to form an image; the object detection apparatus as described above, configured for enabling a user to input or select a query object, and to detect the query object in the formed image; and an imaging control unit configured for performing imaging control according to the detected query object.

By virtue of the method and the apparatus according to the present invention, since the query object can be used in creating the detector, various objects of the specific object type can be precisely detected with high flexibility. In addition, since the detector is created from the general model which has been stored offline in advance, the efficiency of the detection can also be high.

More specifically, the disclosure in the present specification provides a mechanism by combining offline training and online querying for detecting a particular object. The step for training classifiers which is time-consuming is performed offline beforehand only once, and the classifiers are specialized during the online querying step. In this way, the computation amount exerted on the online calculation module is reduced and operations can be performed in real-time even with embedded systems. According to some embodiments of the present invention, a user can input (query) an object to be detected, and then cause the system to detect the queried object in an image. In addition, according to some embodiments of the present invention, since the classifiers are obtained by training using a good amount of samples during the offline stage, the object detection has high accuracy and robustness, and also has reasonable tolerance to object variance.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Figure 1:
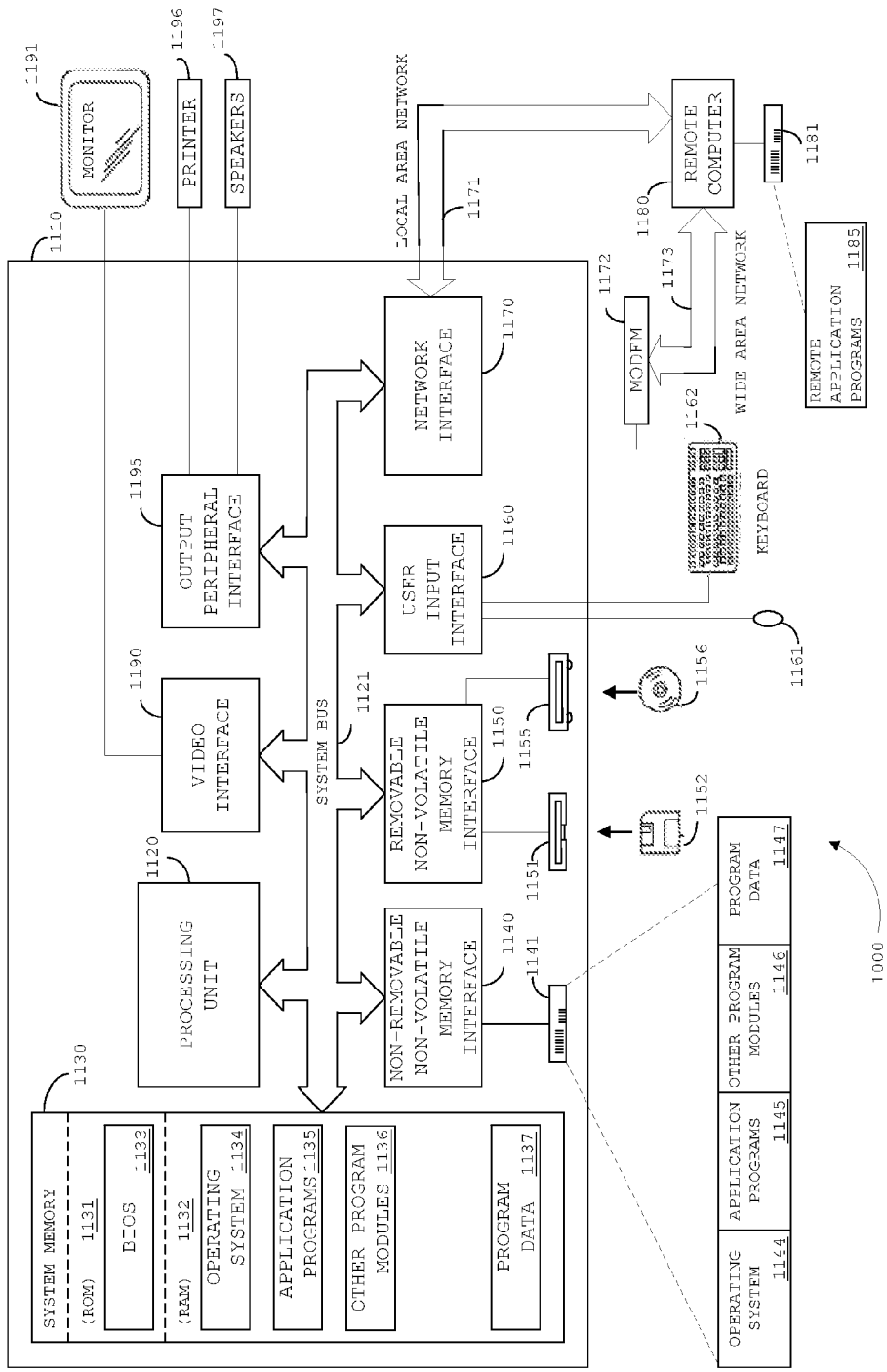
FIG. 1 is a block diagram showing an exemplary hardware configuration of a computer system which can implement the embodiments of the present invention.

Various exemplary embodiments, features, and aspects of the disclosure will be described in detail below with reference to the drawings.

Please note that similar reference numerals and letters refer to similar items in the figures, and thus once an item is defined in one figure, it need not be discussed for following figures.

FIG. 1 is a block diagram showing a hardware configuration of a computer system 1000 which can implement the embodiments of the present invention.

As shown in FIG. 1, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 1 is merely illustrative and is in no way intended to limit the invention, its application, or uses.

The computer system shown in FIG. 1 may be implemented to any of the embodiments, either as a stand-alone computer, or as a processing system in an apparatus, possibly with one or more unnecessary components removed or with one or more additional components added. For example, the computer system can be adapted to one which is suitably incorporated into a camera.

Figure 2:
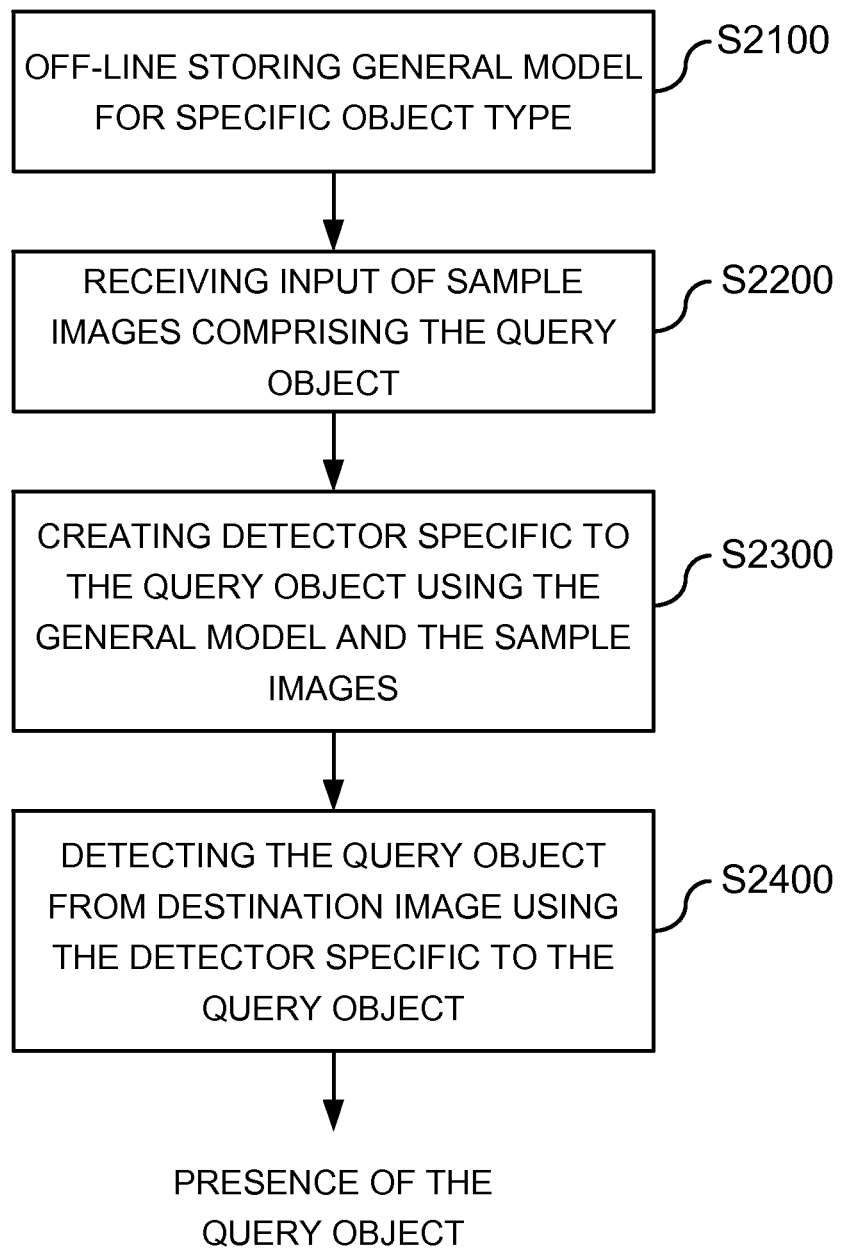
FIG. 2 is a flowchart showing the object detection method according to an embodiment of the present invention.

FIG. 2 is a flowchart showing the object detection method according to the embodiment. In the object detection method shown in FIG. 2, a query object of a specific object type is to be detected from a destination image.

In step S2100, a general model for the specific object type is stored offline in advance. The general model can describe the general features of objects of the specific object type. More specifically, the general model can describe a plurality of components which are expected to co-exist in a single object of the specific object type.

Figure 3A:
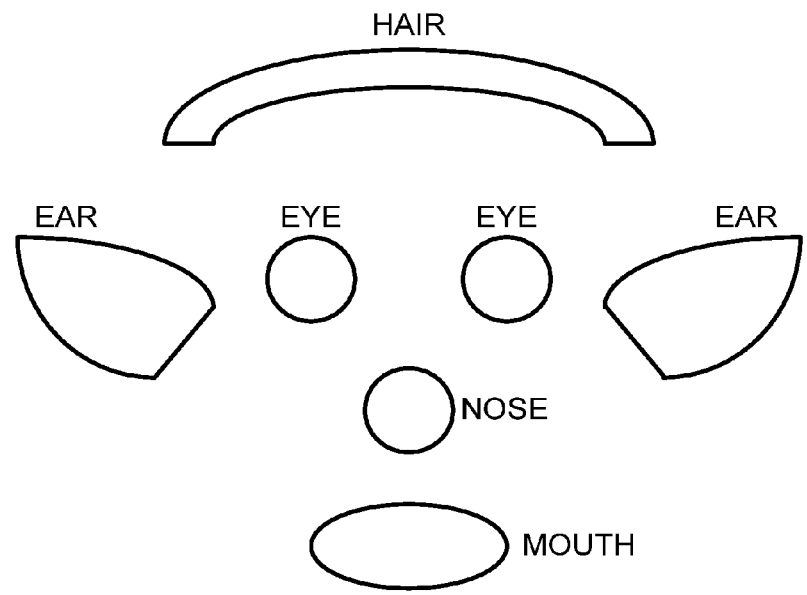
FIGS. 3A and 3B show some examples of the general model.
Figure 3B:
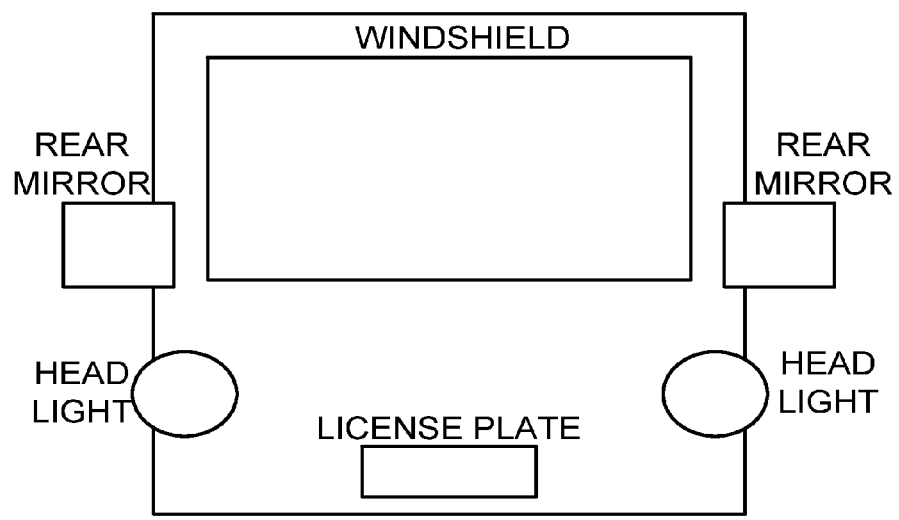

FIGS. 3a and 3b show some examples of the general model. According to the example of FIG. 3a, the specific object type is a "mammal's face", and the plurality of components which are expected to co-exist in a single object of the specific object type are, for example, "ear", "eye", "nose", "mouth" and "hair". According to the example of FIG. 3b, the specific object type is a "vehicle's front view", and the plurality of components which are expected to co-exist in a single object of the specific object type are, for example, "windshield", "rear mirror", "head light" and "license plate".

The examples of the general model shown in FIGS. 3a and 3b are only exemplary and illustrative. Various general models can be designed according to specific applications. For example, it is possible to define the specific object type to be a "human body", and the plurality of components described by the general model can include "arm", "leg", "head" and "trunk".

According to the embodiment, the general model is stored offline in advance, and the general model can be used for any query object to be input online, as long as the query object is of the specific object type. Here the query object means an object to be detected from the destination image. In a case where the specific object type is the "mammal's face" (the example shown in FIG. 3a), the query object can be, for example, a face of a specific cat, a face of a specific dog, a face of a specific person or the like.

In step S2200, input of one or more sample images is received. Said one or more sample images each comprises a same query object which is an object of the specific object type. The sample image can be an image having a normalized size.

That is to say, there can be only one sample image or a plurality of (that is, two or more) sample images. When there are a plurality of sample images, the sample images can be different images but include the same query object which is of the specific object type. For the example shown in FIG. 3a, the query object can be, for example, a face of a particular cat, and the one or more sample images can be one or more images comprising the face of the particular cat.

In step S2300, a detector specific to said query object is created using the general model and said one or more sample images.

In this step, the query object presented in the sample images is used to create the detector from the general model. The detector is a detector which is specifically used to detect the query object. For the example shown in FIG. 3a, the detector is created using the general model of the mammal's face and the one or more sample images comprising the face of the particular cat, so as to specifically detect the face of the particular cat.

The step S2300 can be performed online after the query object is input.

In step S2400, the created detector specific to said query object is used to detect said query object from a destination image. The destination image can be an image from a database such as an image library, or can be an image shot by a camera in real-time, or can be a frame from a video. The destination image can be an image having a normalized size.

According to the method of the embodiment, because a specific detector is created online from the general model by using the query object, the method has flexibility for various objects, and is not limited to objects which are registered in advance. In addition, because a general model is generated and stored offline, the efficiency of the detection can be acceptable.

According to one embodiment of the present invention, in the sample image receiving step S2200, labelling of the respective components in the one or more sample images can be received or generated.

It is possible that the labelling of the respective components is performed by the user. In this case, a user interface can be provided to facilitate the labelling.

Figure 4A:
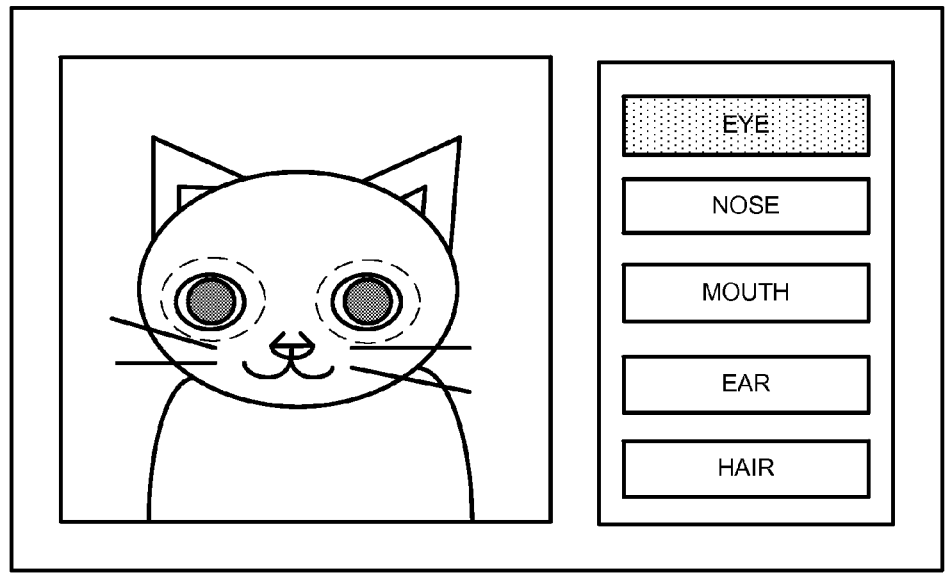
FIGS. 4A and 4B show examples of a user interface which enables the user to label components in a sample image.
Figure 4B:
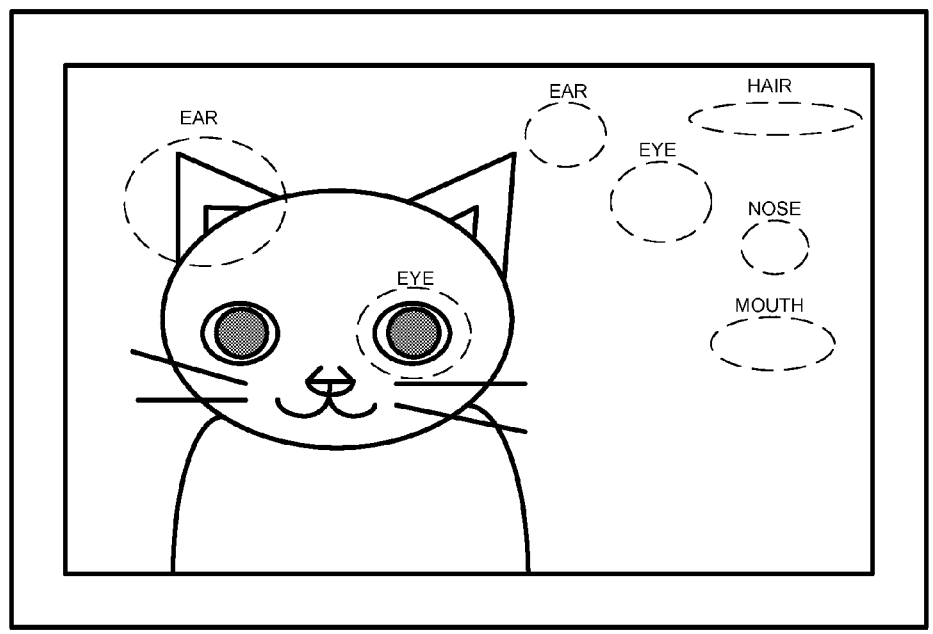

FIGS. 4a and 4b show examples of a user interface which enables the user to label components in a sample image.

In the example shown in FIG. 4a, buttons representative of respective components are shown on a screen. After selecting a button, the user can point out or circle the corresponding component in the sample image. For example, the user can select the component "EYE" (shading on a component button in FIG. 4a means that the component is selected), and then circle the eye regions in the sample image (the circles labelled by the user are shown with broken lines in FIG. 4a).

In the example shown in FIG. 4b, circles representative of respective components are shown on the screen, and the user can drag and resize the circles so that they enclose the corresponding components in the sample image. As shown in FIG. 4b, one ear and one eye have been labelled by the user.

Although FIGS. 4a and 4b show some examples of labelling the respective components in the sample image, the present invention is not limited thereto. It is also possible to generate the labelling automatically without user's intervention. For example, it is possible to use classifiers in the general model to label the respective components in the sample image. It is also possible to use other detectors for the specific object type to label the respective components in the sample image. In addition, it is also possible that labelling is first performed automatically, and then adjusted by the user manually.

Furthermore, although not shown in FIGS. 4a and 4b, it is also possible to label the whole query object (cat's face in this example) from the sample image.

The positions and sizes of respective components labelled can be received and stored for later use. The position and size of the query object labelled can also be stored for later use.

Figure 5:
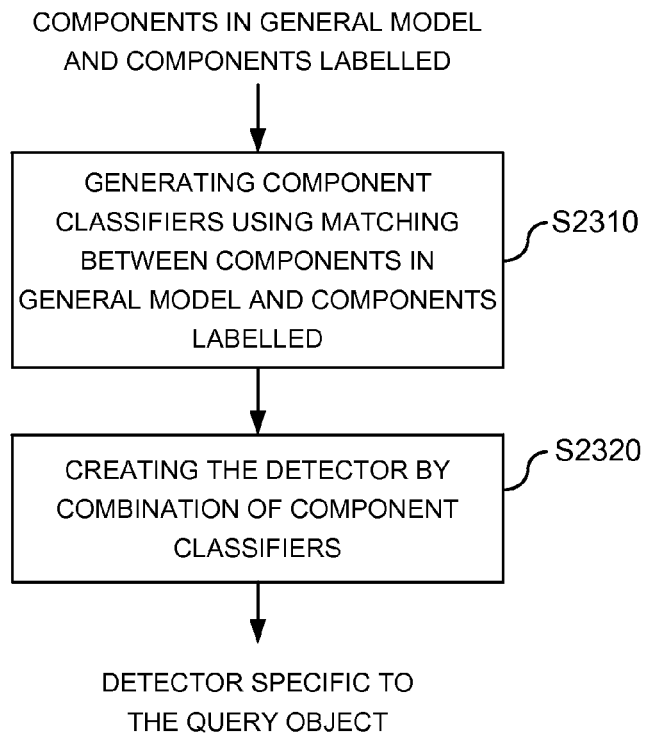
FIG. 5 shows an exemplary process of the object detector creating step according to an exemplary embodiment of the present invention.

FIG. 5 shows an exemplary process of the object detector creating step S2300 according to an exemplary embodiment of the present invention.

As shown in FIG. 5, the step S2300 can comprise a component classifier generating step S2310 and a component classifier combining step S2320.

In the step S2310, matching between respective components in the general model and respective components labelled in said one or more sample images is used to generate a plurality of component classifiers specific to the respective components of said query object.

Again taking the example shown in FIG. 3a, matching can be performed between the components shown in FIG. 3a (mammal's eyes and ears and so on) and the components shown in FIGS. 4a and 4b (the particular cat's eyes and ears and so on), and a plurality of component classifiers are generated which are specific to the components of the particular cat according to the result of the matching. For example, an eye classifier will be generated which is specific to the eye of the particular cat, and an ear classifier will be generated which is specific to the ear of the particular cat, and so on.

In the step S2320, the component classifiers generated corresponding to the respective components in the step S2310 are combined to create the detector specific to said query object.

Various ways of combining the component classifiers can be adopted here.

For example, the combination may be designed such that the created detector specific to said query object judges that the query object is detected in a case where components of more than a predetermined number or more than a predetermined proportion (for example, about 60%) are detected by the plurality of component classifiers (which means the candidate image region should comprise enough components). For example, in a case where there are altogether 7 components in the general model (i.e. two eyes, two ears, one mouth, one hair and one nose), the combination can be designed so as to make the query object be detected in a candidate image region when 4 or more components are detected in the candidate image region by corresponding component classifiers.

It is also possible that the general model further comprises a positional relationship between the plurality of components.

Figure 6:
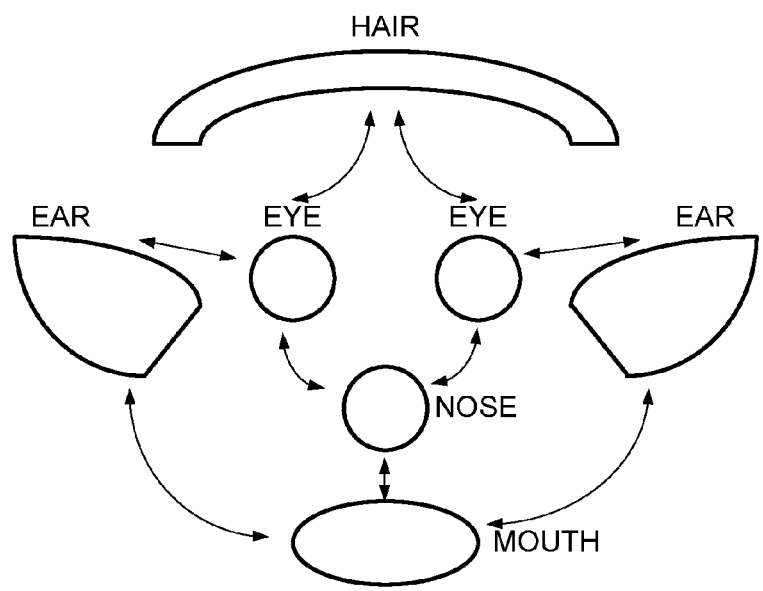
FIG. 6 is an illustrative diagram showing the general model comprising a positional relationship between the plurality of components according to an exemplary embodiment.

FIG. 6 is an illustrative diagram showing the general model comprising a positional relationship between the plurality of components according to an exemplary embodiment.

Using the mammal's face as an example, the positional relationship between the components can be, for example, the eyes are below the hair, the nose is below the eyes, the mouth is below the nose, and the like.

In this case, the combination can be designed such that the detector specific to said query object judges that the query object is detected in a case where components of more than a predetermined number or more than a predetermined proportion are detected by the plurality of component classifiers (which means the candidate image region should comprise enough components) and furthermore the detected components satisfy the positional relationship therebetween (which means that the detected components should satisfy a predetermined relationship). According to such a combination, even if all the components are respectively detected in the candidate image region, if the relationship is wrong (for example, if one eye is below the mouth or one ear is between the eyes), the detector will not deem that the query object is detected in the candidate image region.

For methods for defining positional relationship between components and methods for judging whether two positional relationships match each other, part model methods (see, for example, Pedro Felzenszwalb et. al., "A Discriminatively Trained, Multiscale, Deformable Part Model", IEEE Conference on Computer Vision and Pattern Recognition, 2008. CVPR 2008, 23-28 Jun. 2008, pages 1-8) and graph similarity measurement methods (see, for example, Laura Zager, "graph similarity and matching", Thesis for Master of Science, Massachusetts Institute of Technology, 2005) can be used for example.

Other methods for defining the combination can also be adopted. For example, it is possible to calculate a sum or an average value of classification scores (for example, probability scores or confidence scores) obtained from the respective component classifiers, and the detector determines that the query object is detected in a case where the sum or the average value is larger than a predetermined threshold. That is to say, any combination can be designed and used here.

In the following, some exemplary embodiments of the general model and the component classifier generating step S2310 will be described.

Figure 7:
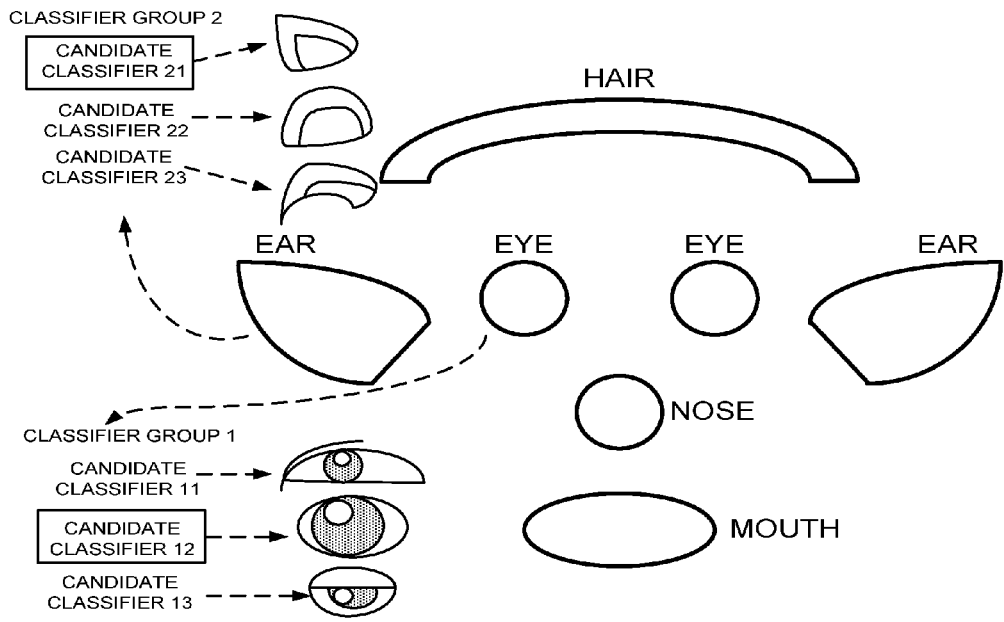
FIG. 7 shows an example of how to use the general model to generate component classifiers according to one exemplary embodiment.

FIG. 7 shows an example of how to use the general model to generate component classifiers according to one exemplary embodiment.

The general model according to this exemplary embodiment comprises a plurality of classifier groups, and each of the plurality of classifier groups corresponds to one of the plurality of components. Each of the plurality of classifier groups comprises a plurality of candidate classifiers for describing a plurality of different feature instances of the corresponding component of the specific object type. For example, the general model comprises a classifier group 1 for eyes and a classifier group 2 for ears, as shown in FIG. 7. Although not shown, the general model can further comprise a classifier group 3 for noses, a classifier group 4 for hair and a classifier group 5 for mouths. Here different feature instances mean features with different feature values, which represent different appearances. For example, the different feature instances can include different colors, different shapes, different textures or the like.

Taking the classifier group 1 for example, the classifier group 1 may comprise a plurality of candidate classifiers, that is, a candidate classifier 11 corresponding to an eye of a particular human, a candidate classifier 12 corresponding to an eye of a particular cat, and a candidate classifier 13 corresponding to an eye of a particular dog. Similarly, the classifier group 2 may comprise a plurality of candidate classifiers, that is, a candidate classifier 21 corresponding to an ear of a particular cat, a candidate classifier 22 corresponding to an ear of a particular dog, and a candidate classifier 23 corresponding to an ear of another particular dog.

Each candidate classifier is generated by being trained offline in advance with corresponding training samples. For example, a candidate classifier for an eye is generated by being trained offline in advance with training samples of that type of eyes. Many features and training/learning methods can be used for generating the candidate classifiers. For example, well-known HOG features (Histograms of Oriented Gradients) and SVM (Support Vector Machine) methods can be used. A simple example of a classifier can define a feature space involving one or more features (a feature array) as coordinates of a feature point in the feature space, and a classification score output by the classifier for an input image is calculated as a function f(d) of a distance d between a center point (for example, a mean value of a statistic model of the feature array generated by a plurality of training images) in the feature space and a feature point describing the input image. The function f(d) is not limited to specific functions, and it suffices if it is a function which decreases strictly monotonously as the distance d increases. It is also possible to normalize the respective features by dividing each feature by a variance of the corresponding feature or to apply weights to the respective features according to specific applications, before the distance is calculated.

For methods for generating candidate classifiers for organs such as eyes, noses and ears, the methods proposed in Nicolas Gourier Daniela Hall James L. Crowley, "Facial Features Detection Robust to Pose, Illumination and Identity" IEEE International Conference on Systems, Man and Cybernetics, 2004, pp. 617-622, vol. 1, Nello Cristianini and John Shawe-Taylor, "An Introduction to Support Vector Machines and other kernel-based learning methods", Cambridge University Press, 2000. ISBN 0-521-78019-5 ([2] SVM Book), Corinna Cortes and V. Vapnik, "Support-Vector Networks", Machine Learning, 20, pp. 273-297, 1995 can be used, for example.

Although some of the classifiers are mentioned as examples in the above, all kinds of classifiers can be used, as long as the classifier can have an image as input, and output a classification score indicating the probability or confidence that the image comprises the component. A threshold can be set so that if the classifier outputs a classification score higher than the threshold, the classifier determines that the image comprises the component.

In this exemplary embodiment, in the component classifier generating step S2310, for each component, a candidate classifier which is optimal in describing the component of said query object is selected from the corresponding classifier group, as the component classifier for this component.

For example, when the sample image is the one shown in FIG. 4a or 4b, the candidate classifier which is optimal in describing the eyes of the query object (the cat shown in the sample image) may be the candidate classifier 12 (for round cat eyes), and the candidate classifier 12 will be selected from the classifier group 1 as the component classifier for the eyes. Similarly, the candidate classifier will be selected from the classifier group 2 as the component classifier for the ears. In this way, for each classifier group, a candidate classifier optimal for describing respective component of the query object (in this example, the particular cat) is selected, and these optimal candidate classifiers are taken as component classifiers for the query object.

Figure 8:
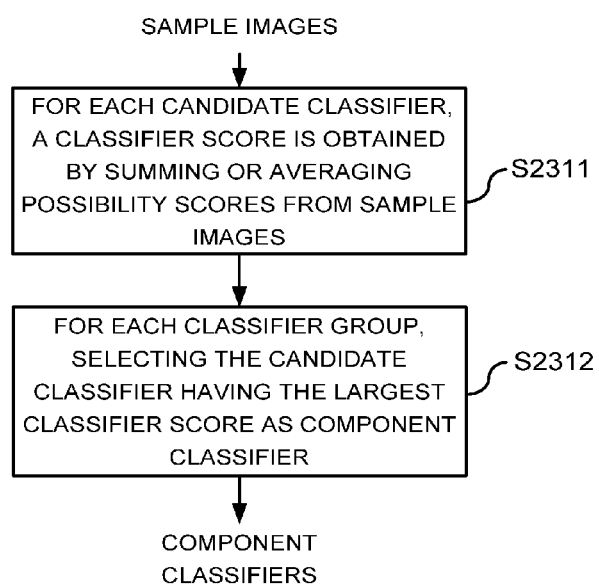
FIG. 8 shows a flowchart of an exemplary process of the component classifier generating step according to an exemplary embodiment.

FIG. 8 shows a flowchart of an exemplary process of the component classifier generating step S2310 according to an exemplary embodiment.

As shown in FIG. 8, the component classifier generating step S2310 may comprise a classifier score obtaining step S2311 and a selecting step S2312.

As shown in FIG. 8, the component classifier generating step S2310 may comprise a classifier score obtaining step S2311 and a selecting step S2312.

In the step S2311, for each candidate classifier in each classifier group, classification scores obtained by making the corresponding components labelled in respective sample images undergo the candidate classifier are summed or averaged, to obtain a classifier score for the candidate classifier.

For the example shown in FIG. 7, we presume that there are two sample images (a first sample image and a second sample image), and the classification scores obtained by the candidate classifier 11 from the first and second sample images are 0.3 and 0.2 respectively, the classification scores obtained by the candidate classifier 12 from the first and second sample images are 0.8 and 0.7 respectively, and the classification scores obtained by the candidate classifier 13 from the first and second sample images are 0.4 and 0.5 respectively. In this case, when the classifier score for a candidate classifier is represented by an average of the classification scores, the classifier score for the candidate classifier 11 is (0.3+0.2)/2=0.25, the classifier score for the candidate classifier 12 is (0.8+0.7)=0.75, and the classifier score for the candidate classifier 13 is (0.4+0.5)=0.45.

In the step S2312, for each classifier group, a candidate classifier having the largest classifier score is deemed as "optimal" in describing the corresponding component of the query object, and is selected as the component classifier for the corresponding component.

Still for the example shown in FIG. 7, since the candidate classifier 12 has the largest classifier score as calculated above, the candidate classifier 12 will be selected as the component classifier optimal in describing the eyes of the query object.

In the similar way, every component will have one component classifier selected from the corresponding classifier group by using the sample images, and these component classifiers can be combined into a detector specific to the query object. The combination can be designed as needed or as appropriate, as has been aforementioned.

According to this exemplary embodiment, because a general model comprising candidate classifiers is prepared offline in advance, it is not necessary to build a specific classifier every time a new query object is to be detected, and therefore the efficiency of the detection can be high. In addition, because there can be several candidate classifiers for each component, the method has enough flexibility and accuracy for various objects. For example, in a case where four different objects are used in advance for training the respective candidate classifiers, each of N classifier groups will have four candidate classifiers, and theoretically $4^N$ kinds of possible detectors can be generated from the general model by combining these candidate classifiers.

Figure 9:
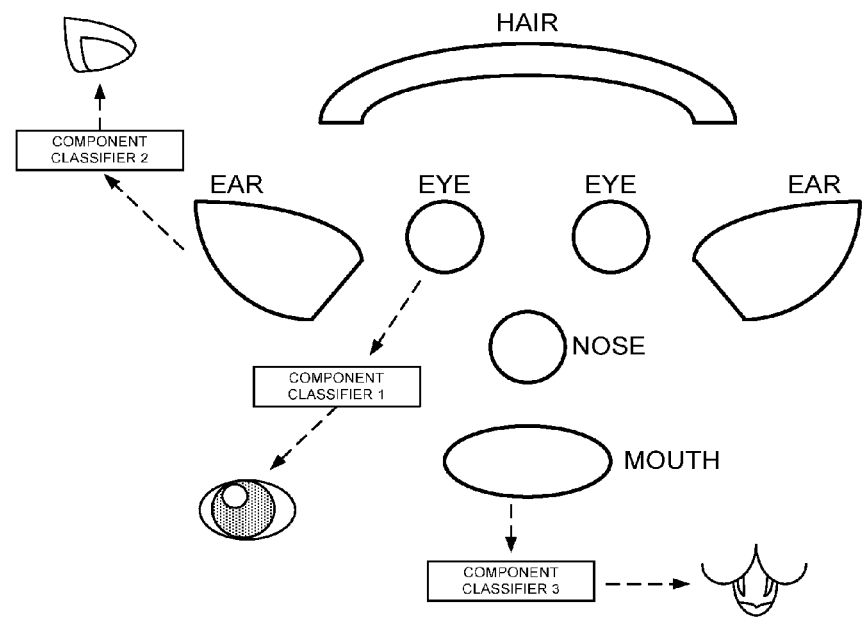
FIG. 9 shows an example of how to use the general model to generate component classifiers according to another exemplary embodiment.

FIG. 9 shows an example of how to use the general model to generate component classifiers according to another exemplary embodiment.

The general model according to this exemplary embodiment comprises a plurality of coarse classifiers which correspond to the plurality of components respectively. Each of the plurality of coarse classifiers can describe a corresponding general feature of the corresponding component of the specific object type. The general features can include a color, a shape, a texture, a histogram feature, the combination thereof or the like. The general features can have relatively broad value ranges which are suitable for describing all objects of the specific type. For example, the aspect ratio (a ratio of length to width) of an eye can be defined to be within the range of 0.8~2 (or a statistic model with a mean value of 1.4 and a variance of 0.6) in the coarse classifier for eyes for mammals.

In this exemplary embodiment, it is possible to use the coarse classifiers to automatically label the respective components in the sample image.

According to this exemplary embodiment, in the component classifier generating step S2310, for each component, the corresponding general feature described by the corresponding coarse classifier is further defined (refined) to a corresponding specific feature according to the component of said query object, and thereby a corresponding component classifier for describing the corresponding specific feature is generated from the corresponding coarse classifier.

For the example shown in FIG. 9, the general feature (for example, an aspect ratio of 0.8~2) for the eye of mammals can be further defined (refined) to a specific feature according to the particular cat shown in FIGS. 4a and 4b. For example, when the sample image shows an eye with an aspect ratio of 1, the specific feature (the aspect ratio of an eye) for the eye can be refined to, for example, 0.8~1.2 (or a statistic model with a mean value of 1 and a variance of 20% of the mean value) which is more specific than 0.8~2. For another example, when two sample images show an eye with an aspect ratio of 1 and an eye with an aspect ratio of 1.2, the specific feature (the aspect ratio of an eye) for the eye can be refined to, for example, 0.9~1.3 (or a statistic model with a mean value of (1+1.2)/2 and a variance of (1.2−1)) which is more specific than 0.8~2. In this way, a component classifier with this specific feature can be generated from the coarse classifier.

In addition or as an alternative, it is possible that the general feature (feature array) is refined into a specific feature array by adding new features. For example, it is possible that the general feature for an eye only includes an aspect ratio feature, and the general feature can be refined into a more specific feature array by adding a color feature and a texture feature.

In the similar way, every component will have one component classifier generated from corresponding coarse classifier of the general model by using the sample images, and these component classifiers can be combined into a detector specific to the query object. The combination can be designed as needed or as appropriate, as has been aforementioned.

Figure 10:
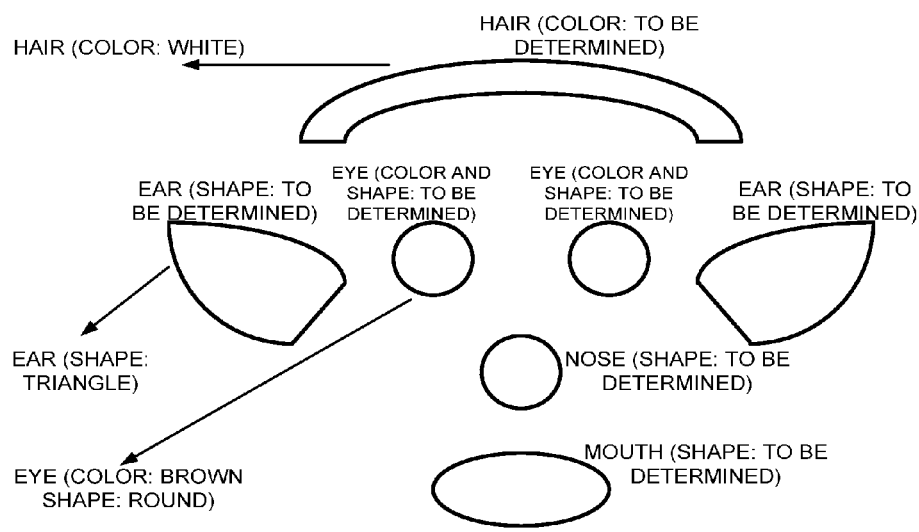
FIG. 10 shows an example of how to use the general model to generate component classifiers according to yet another exemplary embodiment.

FIG. 10 shows an example of how to use the general model to generate component classifiers according to yet another exemplary embodiment.

The general model according to the present embodiment comprises a plurality of incomplete classifiers which correspond respectively to the plurality of components. Each of the plurality of incomplete classifiers has a feature parameter which has not been determined.

An incomplete classifier may have a general constitution, but one or more feature parameter for the general constitution is not determined. For example, the classifier may have color and aspect ratio as its features, but the center values (mean values of statistic models) and/or variances of the color and the aspect ratio are not determined yet.

According to this exemplary embodiment, in the component classifier generating step S2310, for each component, the feature parameter of the corresponding incomplete classifier is determined according to the component of said query object, and thereby a corresponding component classifier for which the feature parameter has been determined is formed from the corresponding incomplete classifier.

Figure 11:
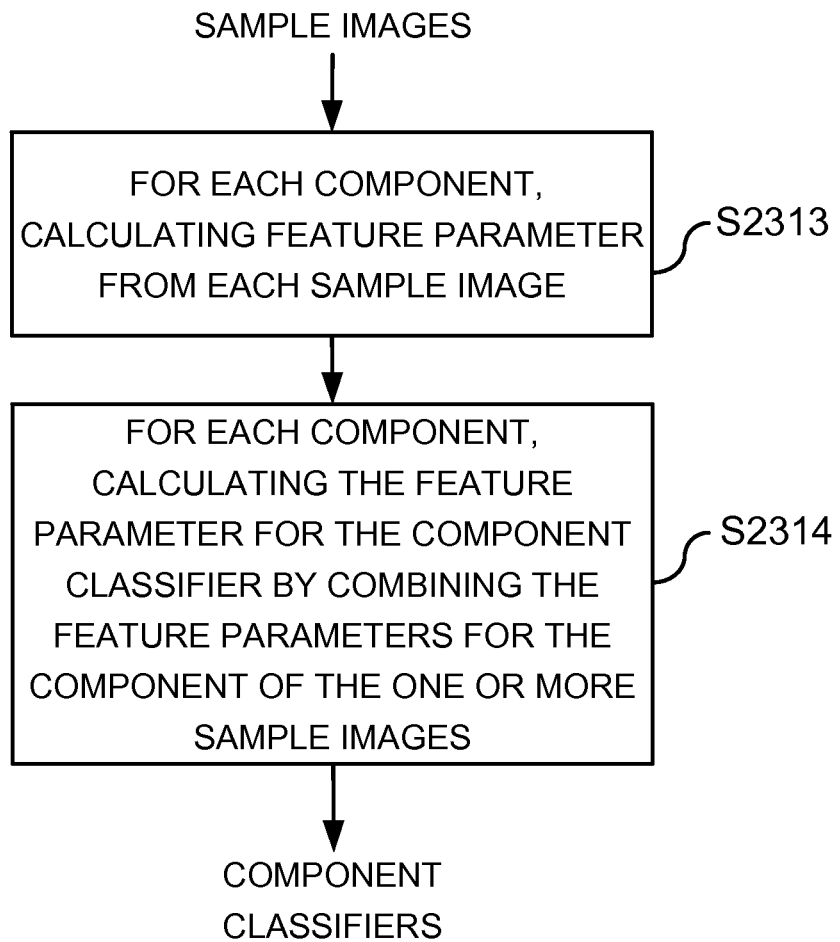
FIG. 11 shows a flowchart of an exemplary process of the component classifier generating step according to this yet another exemplary embodiment.

FIG. 11 shows a flowchart of an exemplary process of the component classifier generating step according to this yet another exemplary embodiment.

As shown in FIG. 11, the component classifier generating step S2310 may comprise a feature parameter calculating step S2313 and a combining calculating step S2314.

In the step S2313, for each component, the feature parameter for the component of each of the one or more sample images is calculated by determining the feature parameter for the corresponding incomplete classifier according to the component labelled in the sample image.

In the step S2314, for each component, the feature parameter for the corresponding component classifier is calculated by combining the feature parameters for the component of the one or more sample images.

Here, combining the feature parameters can be, for example, averaging the feature parameters. It is also possible that the feature parameters are combined in other ways. It is also possible to obtain other values from the combining of a plurality of feature parameters. For example, it is possible to combining a feature parameter from a sample image which is equal to 2 and a feature parameter from another sample image which is equal to 4 so that a mean value of 3 and a variance of 2 are obtained as the feature parameter for the query object. Therefore, the combination is not limited to any specific one.

For the example shown in FIG. 10, an incomplete classifier for an eye may include a model involving a color feature and a shape feature, but parameters for the model is not determined yet. For example, when two sample images show an eye with an aspect ratio of 1 and a RGB color of (50, 150, 200), and an eye with an aspect ratio of 1.2 and a RGB color of (30, 170, 220), the mean value of an eye model (the center point of the feature space) of the query object can be determined as an aspect ratio of 1.1 and a RGB color of (40, 160, 210) which are the average of the parameters of the two sample images. In this way, a component classifier with the parameter determined can be generated from the incomplete classifier.

In the similar way, every component will have one component classifier generated from corresponding incomplete classifier of the general model by using the sample images, and these component classifiers can be combined into a detector specific to the query object. The combination can be designed as needed or as appropriate, as has been aforementioned.

Figure 12:
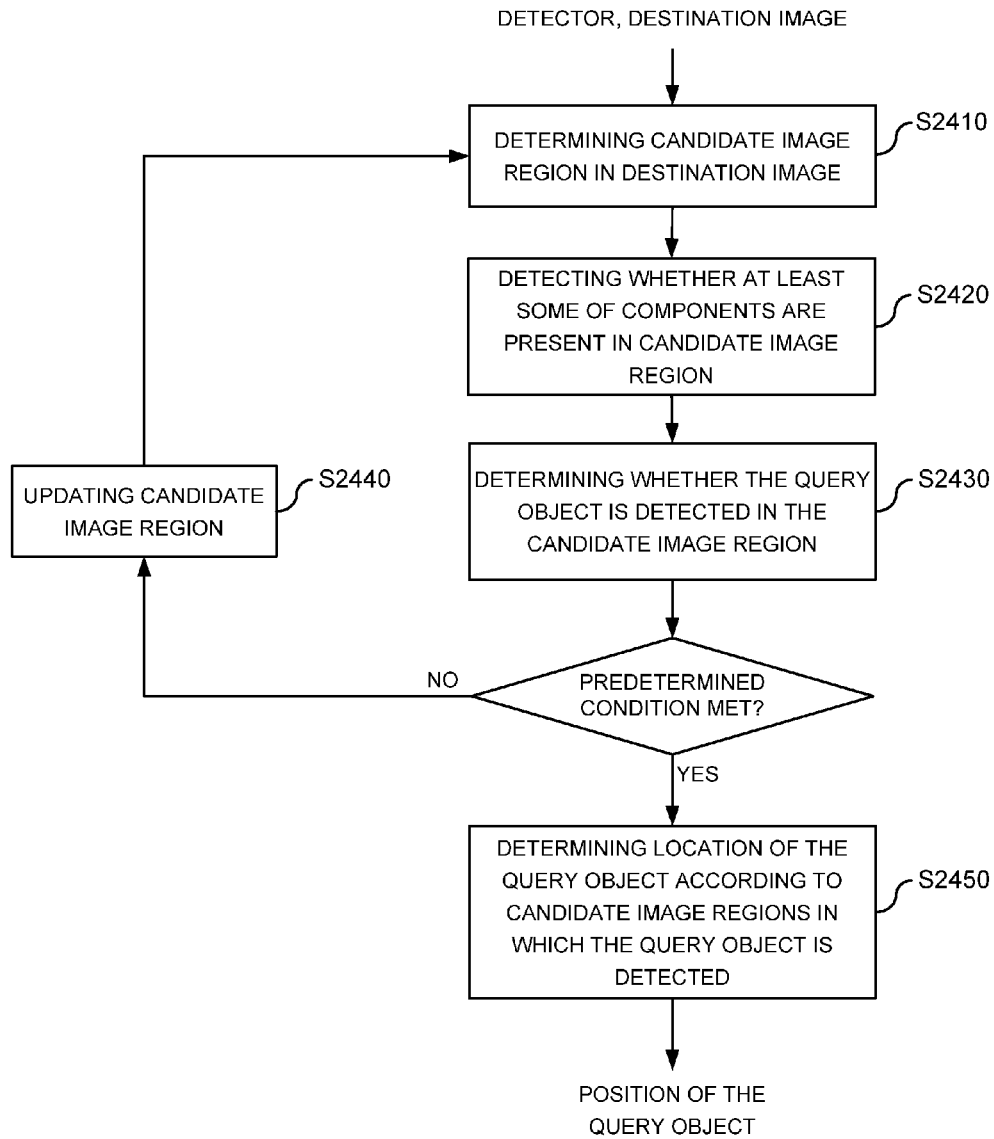
FIG. 12 shows a flowchart of an exemplary process of the object detecting step according to an exemplary embodiment.

FIG. 12 shows a flowchart of an exemplary process of the object detecting step S2400 according to an exemplary embodiment.

As shown in FIG. 12, the step S2400 may include a candidate image region determining step S2410, a first detecting sub-step S2420 and a second detecting sub-step S2430.

In the step S2410, a candidate image region is determined in the destination image by using a sliding window. The initial size of the sliding window can be determined to be a smallest size of a possible image that can comprise the query object, and can be determined according to specific applications.

In the step S2420, it is detected whether at least some of the plurality of components are present in the candidate image region. For example, in the step S2420, the component classifiers of the detector specific to the query object generated in the step S2300 can be used to detect the components in the candidate image region.

And then, in the step S2430, it is determined whether the query object is detected in the candidate image region according to the detection result in the step S2420.

Please note that the detector specific to the query object is used in the step S2400 to detect the query object, and therefore the specific way of detecting in the step S2400 may correspond to the specific way of generating the detector in step S2300. Therefore, although S2410-S2430 show an exemplary process for the step S2400, it is possible to adopt other ways of detecting, as long as the detector specific to the query object generated in the step S2300 is used.

Figure 13:
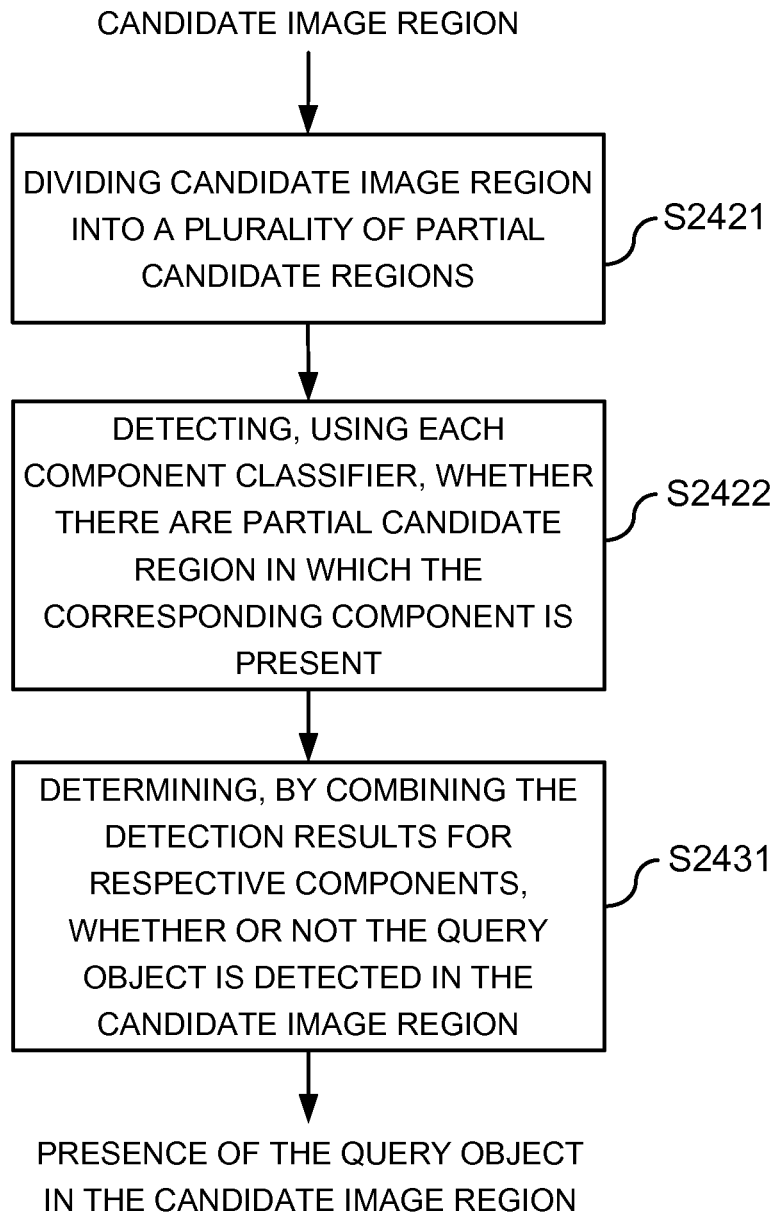
FIG. 13 shows a flowchart of an exemplary process of the first detecting sub-step and the second detecting sub-step according to an exemplary embodiment.

FIG. 13 shows a flowchart of an exemplary process of the first detecting sub-step S2420 and the second detecting sub-step S2430 according to an exemplary embodiment.

As shown in FIG. 13, the step S2420 can comprise a dividing step S2421 and a component detecting step S2422.

In the step S2421, the candidate image region is divided into a plurality of partial candidate regions. The size of a partial candidate region can be determined by the size of the candidate image region and the ratio between a largest expected component and the query object, and can be determined according to specific applications. According to one exemplary embodiment, in the step S2200, not only the components but also the position and the size of the query object (the cat's face in this example) can be labelled, and the ratio between a largest expected component and the query object can be determined from the labelling performed in the step S2200.

In the step S2422, each of the plurality of component classifiers is used to detect whether there is one or more of the partial candidate regions in which the corresponding component is present. More specifically, for each component and for each partial candidate region, it is detected whether the component is present in the partial candidate region by using the corresponding component classifier. It is possible to store the detection result as to which partial candidate region is detected to comprise which component.

As shown in FIG. 13, the step S2430 can comprise a combining determining step S2431 of determining whether or not said query object is detected in the candidate image region by combining the detection results for the respective components in the step S2420.

The combination here may correspond to the combination used when the detector specific to the query object is generated.

For example, in the step S2431, it can be determined that the query object is detected in the candidate image region in a case where components of more than a predetermined number or more than a predetermined proportion are detected by the plurality of component classifiers.

For another example, in the step S2431 it can be determined that the query object is detected in the candidate image region in a case where components of more than a predetermined number or more than a predetermined proportion are detected by the plurality of component classifiers and the detected components satisfy a positional relationship therebetween. In this case, it is necessary for the component detecting step S2422 to further comprise a component position determining step of determining, if it is detected that a partial candidate region comprises a component, the position of the component in the candidate image region. The position of the component can be determined in various ways. For example, the position of the component can be determined according to the position of the partial candidate region, or can be determined by detecting the coordinates of center (the geometrical center or the gravity center) of the component.

For yet another example, it is also possible that the combination is designed such that the query object is detected in the candidate image region in a case where a weighted sum of classification scores obtained by the plurality of component classifiers is larger than a predetermined threshold.

Since various ways of combining the component classifiers can be used to generate the detector, corresponding ways of combining the detection results for the respective components may be used, and the ways are not limited to those which have been exemplified.

As shown in FIG. 12, the step S2400 may further include a candidate image region updating step S2440 and an object locating step S2450.

It is judged whether a predetermined condition is met or not. If a predetermined condition is not met, the flow goes to the step S2440 in which the candidate image region is updated. Then the flow goes back to S2410, and the candidate image region determining step S2410, the first detecting sub-step S2420 and the second detecting sub-step S2430 are performed on the updated candidate image region.

Here the predetermined condition can be defined arbitrarily according to specific applications. For example, the predetermined condition can be that the candidate image region has reached a maximum size (for example, the size of the destination image). For another example, the predetermined condition can be that enough number of candidate image regions have been detected as comprising the query object.

The updating of the candidate image region can be performed by shifting the sliding window. In addition, when the sliding window has traversed the whole destination image, the sliding window can be shifted to its initial position and is resized (for example, incremented in size by a predetermined amount).

If the predetermined condition is met, the flow goes to the step S2450 in which the location of the query object is determined in the destination image according to the candidate image regions from which the query object is detected.

It is possible that more than one candidate image regions are detected as comprising the query object. In this case, the location (center position and size) of the query object can be determined by, for example, averaging the center positions and sizes of the plurality candidate image regions which are detected as comprising the query object.

With the exemplary process described with reference to FIG. 12, in a case where the query object is detected, the location of the query object in the destination image can also be determined.

Figure 14:
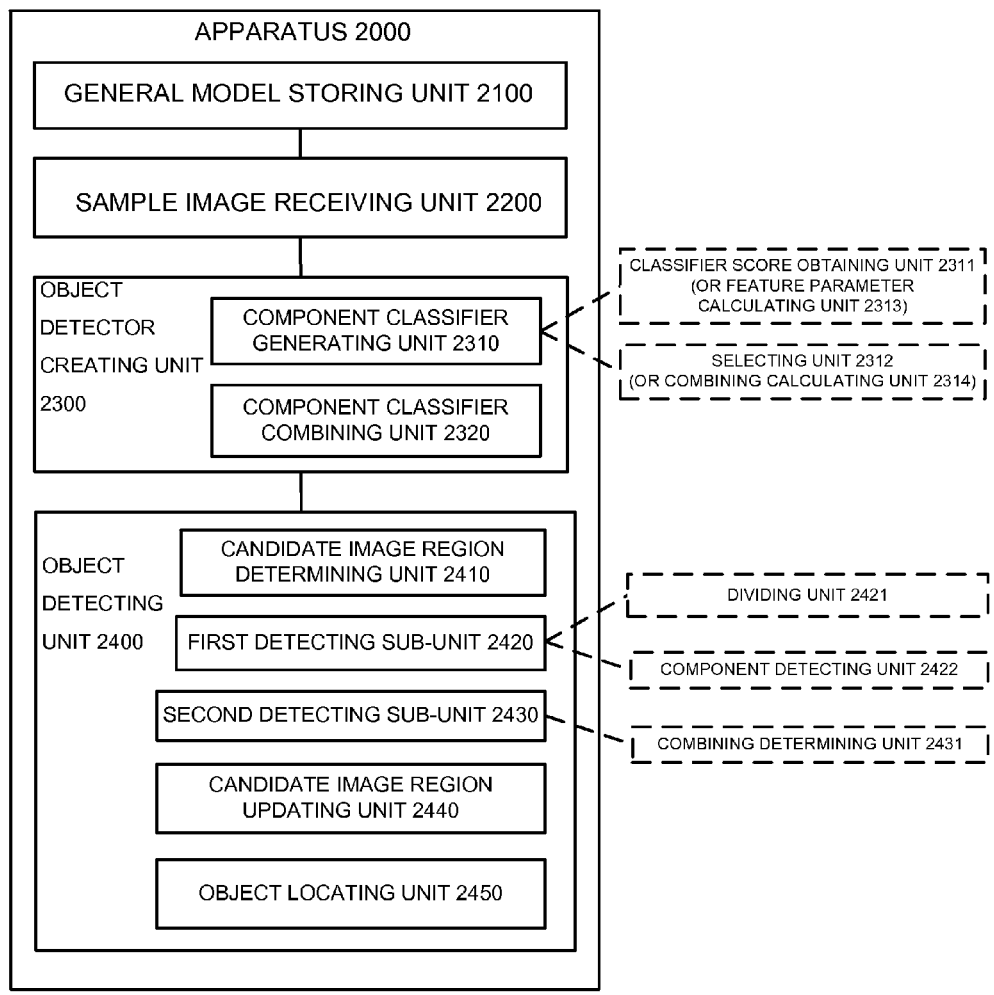
FIG. 14 is a block diagram showing an exemplary configuration of an object detection apparatus according to an exemplary embodiment.

FIG. 14 is a block diagram showing an exemplary configuration of an object detection apparatus 2000 according to an exemplary embodiment of the present invention.

The object detection apparatus 2000 comprises: a general model storing unit 2100 configured for storing a general model for a specific object type offline in advance, the general model describing a plurality of components which are expected to co-exist in a single object of the specific object type; a sample image receiving unit 2200 configured for receiving input of one or more sample images, said one or more sample images each comprises a same query object which is an object of the specific object type; an object detector creating unit 2300 configured for creating, using the general model and said one or more sample images, a detector specific to said query object; and an object detecting unit 2400 configured for detecting, using the created detector specific to said query object, said query object from a destination image.

The units 2100, 2200, 2300 and 2400 can be configured to perform processes of the steps S2100, S2200, S2300 and S2400, respectively.

According to an exemplary embodiment, the sample image receiving unit 2200 can be further configured for receiving or generating labelling of the respective components in the one or more sample images. In this case, the object detector creating unit 2300 may comprise a component classifier generating unit 2310 configured for generating, using matching between respective components in the general model and respective components labelled in said one or more sample images, a plurality of component classifiers specific to the respective components of said query object.

The object detector creating unit 2300 may further comprise a component classifier combining unit 2320 configured for creating the detector specific to said query object by combination of the component classifiers generated corresponding to the respective components.

According to an exemplary embodiment of the present invention, the object detecting unit 2400 may comprise: a candidate image region determining unit 2410 configured for determining a candidate image region in the destination image using a sliding window; a first detecting sub-unit 2420 configured for detecting whether at least some of the plurality of components are present in the candidate image region; and a second detecting sub-unit 2430 configured for determining, according to the detection result in the first detecting sub-unit, whether the query object is detected in the candidate image region.

According to an exemplary embodiment of the present invention, the object detecting unit 2400 may further comprise: a candidate image region updating unit 2440 configured for updating, if a predetermined condition is not met, the candidate image region, and the candidate image region determining unit, the first detecting sub-unit and the second detecting sub-unit function on the updated candidate image region; and an object locating unit 2450 configured for determining, according to the candidate image regions from which the query object is detected, the location of said query object in the destination image.

According to some possible embodiment, the component classifier generating unit 2310 can be configured to perform the process performed in the step S2310 (for example, the processes in steps S2311 and S2312 or processes in steps S2313 and S2314).

For example, the component classifier generating unit 2310 may comprise a classifier score obtaining unit 2311 configured for summing or averaging, for each candidate classifier in each classifier group, classification scores obtained by making the corresponding components labelled in respective sample images undergo the candidate classifier, to obtain a classifier score for the candidate classifier; and a selecting unit 2312 configured for selecting, for each classifier group, a candidate classifier having the largest classifier score as the component classifier for the corresponding component.

For another example, the component classifier generating unit 2310 may comprise a feature parameter calculating unit 2313 configured for calculating, for each component, the feature parameter for the component of each of the one or more sample images by determining the feature parameter for the corresponding incomplete classifier according to the component labelled in the sample image; and a combining calculating unit 2314 configured for calculating, for each component, the feature parameter for the corresponding component classifier by combining the feature parameters for the component of the one or more sample images.

In addition, the first detecting sub-unit 2420 can be configured to perform the process performed in the step S2420 (for example, the processes in steps S2421 and S2422).

For example, the first detecting sub-unit 2420 may comprise: a dividing unit 2421 configured for dividing the candidate image region into a plurality of partial candidate regions; and a component detecting unit 2422 configured for detecting, using each of the plurality of component classifiers, whether there are one or more of the partial candidate region in which the corresponding component is present.

In addition, the second detecting sub-unit 2430 can be configured to perform the process performed in the step S2430 (for example, the process in step S2431). For example, the second detecting sub-unit 2430 may comprise: a combining determining unit 2431 configured for determining whether or not said query object is detected in the candidate image region by combining the detection results for the respective components of the first detecting sub-unit.

In addition, the combining determining unit 2431 can comprise a unit configured for determining that the query object is detected in the candidate image region in a case where components of more than a predetermined number or more than a predetermined proportion are detected by the plurality of component classifiers.

The units described above and units to be described below are exemplary and/or preferable modules for implementing the process described in the present disclosure. The modules can be hardware units (such as a field programmable gate array, a digital signal processor, an application specific integrated circuit or the like) and/or software modules (such as a computer readable program). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

Furthermore, the above apparatuses constituted of various units can be incorporated into a hardware device such as computer, as a functional module. The computer, as a matter of course, has other hardware or software components in addition to these functional modules.

According to the embodiment, because a general model is generated and stored offline in advance, it is not necessary to build the whole model for the detector every time a new query object is to be detected, and therefore the efficiency of the detection can be improved. In addition, because a specific detector is created online from the general model by using the particular query object, the method has flexibility and accuracy for various objects, and is not limited to objects which are registered in advance.

The present invention can be used in many applications. The object detection apparatus 2000 according to the present invention can be applied to, for example, an image pickup apparatus.

Figure 15:
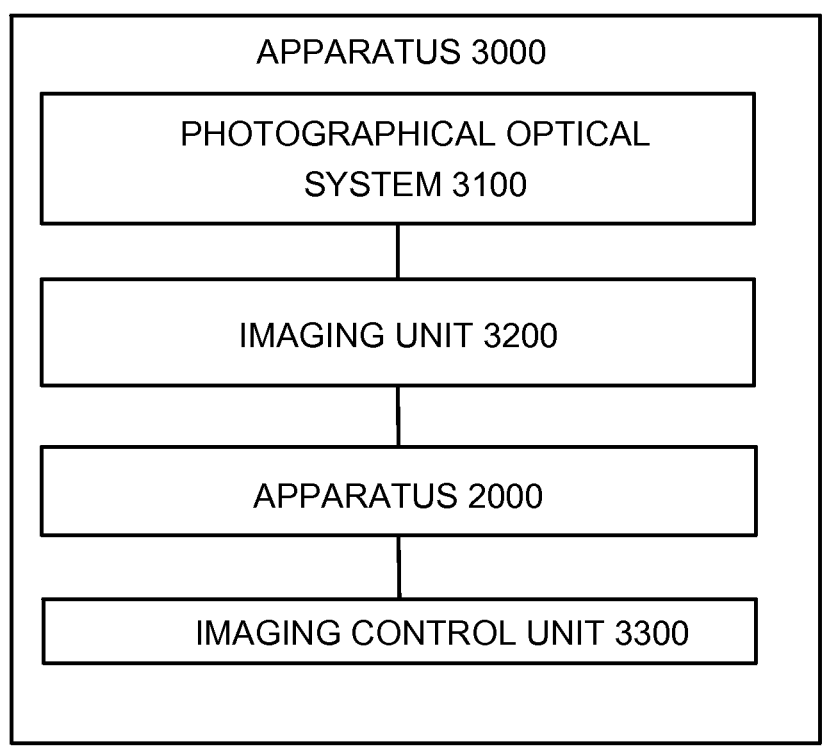
FIG. 15 is a block diagram showing an exemplary configuration of an image pickup apparatus according to an exemplary embodiment.

FIG. 15 is a block diagram showing an exemplary configuration of an image pickup apparatus 3000 according to an exemplary embodiment.

As shown in FIG. 15, the image pickup apparatus 3000 may comprise: a photographical optical system 3100, which may, for example, include optical elements for photographing; an imaging unit 3200 configured for performing imaging to form an image which may include imaging sensors such as CCD sensors or CMOS sensors; the object detection apparatus 2000 described above, which is configured for enabling a user to input or select a query object, and to detect the query object in the formed image; and an imaging control unit 3300 configured for performing imaging control according to the detected query object.

According to an exemplary embodiment of the present invention, the imaging control may comprise increasing a resolution for photographing if the query object is detected. In this way, the image pickup apparatus may operate in an energy saving mode (with low resolution) unless a particular object is present in the image captured.

According to another exemplary embodiment of the present invention, the imaging control may comprise making the photographic optical system 3100 focus on the detected query object if the query object is detected. In this way, the image pickup apparatus 3000 can be configured to focus on the object of interest.

According to yet another exemplary embodiment of the present invention, the imaging control may comprise making the photographic optical system 3100 keep tracking the detected query object so that the query object continues being present in the image to be formed, when the query object is detected. In this exemplary embodiment, photographic optical system 3100 can be configured with mechanical structures which enable the photographic optical system 3100 to rotate automatically according to the imaging control. In this way, the image pickup apparatus 3000 can keep tracking the object of interest and obtain images of the object of interest as many as possible.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the following claims is to be accorded the broadest interpretation so as to encompass all such modifications and equivalent structures and functions.

This application claims the benefit of priority from Chinese Patent Application No. 201210550321.X, filed Dec. 18, 2012, which is hereby incorporated by reference herein in its entirety.

What is claimed is:

1. An object detection method performed by an apparatus which stores a general model for a specific object type in advance, the general model describing a plurality of components which are expected to co-exist in objects of the specific object type, the method comprising:
   a sample image receiving step of receiving one or more sample images, said one or more sample images each comprises a same query object of the specific object type;
   an object detector creating step of creating, using the general model and said one or more sample images, a detector specific to said query object; and
   an object detecting step of detecting, using the created detector specific to said query object, said query object from a destination image,
   wherein the general model comprises a plurality of classifier groups respectively corresponding to the plurality of components, each of the plurality of classifier groups comprising a plurality of candidate classifiers for describing a plurality of different feature instances of a corresponding component of the specific object type.

2. The object detection method according to claim 1, wherein
   in the sample image receiving step, labels of the respective components in the one or more sample images is further received or generated, and
   the object detector creating step comprises:
   a component classifier generating step of generating, using matching between respective components in the general model and respective components labelled in said one or more sample images, a plurality of component classifiers specific to the respective components of said query object.

3. The object detection method according to claim 2, wherein in the component classifier generating step, for each component, a candidate classifier which is optimal in describing the component of said query object is selected from the corresponding classifier group, as the component classifier.

4. The object detection method according to claim 3, wherein the component classifier generating step comprises:
   a classifier score obtaining step of summing or averaging, for each candidate classifier in each classifier group, classification scores obtained by making the corresponding components labelled in respective sample images undergo the candidate classifier, to obtain a classifier score for the candidate classifier; and
   a selecting step of selecting, for each classifier group, a candidate classifier having the largest classifier score as the component classifier for the corresponding component.

5. The object detection method according to claim 2, wherein
   the general model comprises a plurality of coarse classifiers respectively corresponding to the plurality of components, each of the plurality of coarse classifiers for describing a corresponding general feature of the corresponding component of the specific object type, and
   in the component classifier generating step, for each component, by further defining the corresponding general feature described by the corresponding coarse classifier to a corresponding specific feature according to the component of said query object, a corresponding component classifier for describing the corresponding specific feature is generated from the corresponding coarse classifier.

6. The object detection method according to claim 2, wherein
   the general model comprises a plurality of incomplete classifiers respectively corresponding to the plurality of components, each of the plurality of incomplete classifiers having a feature parameter which has not been determined, and
   in the component classifier generating step, for each component, by determining the feature parameter of the corresponding incomplete classifier according to the component of said query object, a corresponding component classifier for which the feature parameter has been determined is formed from the corresponding incomplete classifier.

7. The object detection method according to claim 6, wherein
   the component classifier generating step comprises:
   a feature parameter calculating step of calculating, for each component, the feature parameter for the component of each of the one or more sample images by determining the feature parameter for the corresponding incomplete classifier according to the component labelled in the sample image; and
   a combining calculating step of calculating, for each component, the feature parameter for the corresponding component classifier by combining the feature parameters for the component of the one or more sample images.

8. The object detection method according to claim 2, wherein the object detector creating step further comprises:
   a component classifier combining step of creating the detector specific to said query object by combination of the component classifiers generated corresponding to the respective components.

9. The object detection method according to claim 8, wherein
   said combination is such that the detector specific to said query object judges that the query object is detected in a case where components of more than a predetermined number or more than a predetermined proportion are detected by the plurality of component classifiers.

10. The object detection method according to claim 8, wherein
   the general model further comprises a positional relationship between the plurality of components, and
   said combination is such that the detector specific to said query object judges that the query object is detected in a case where components of more than a predetermined number or more than a predetermined proportion are detected by the plurality of component classifiers and the detected components satisfy the positional relationship therebetween.

11. The object detection method according to claim 2, wherein
the object detecting step comprises:
a candidate image region determining step of determining a candidate image region in the destination image using a sliding window;
a first detecting sub-step of detecting whether at least some of the plurality of components are present in the candidate image region; and
a second detecting sub-step of determining, according to the detection result in the first detecting sub-step, whether the query object is detected in the candidate image region.

12. The object detection method according to claim 11, wherein
the first detecting sub-step comprises:
a dividing step of dividing the candidate image region into a plurality of partial candidate regions; and
a component detecting step of detecting, using each of the plurality of component classifiers, whether there are one or more of the partial candidate region in which the corresponding component is present, and
the second detecting sub-step comprises:
a combining determining step of determining whether or not said query object is detected in the candidate image region by combining the detection results for the respective components in the first detecting sub-step.

13. The object detection method according to claim 12, wherein
said combining determining step comprises: determining that the query object is detected in the candidate image region in a case where components of more than a predetermined number or more than a predetermined proportion are detected by the plurality of component classifiers.

14. The object detection method according to claim 12, wherein
the general model further comprises a positional relationship between the plurality of components,
the component detecting step comprises: a component position determining step of determining, if it is detected that a partial candidate region comprises a component, the position of the component in the candidate image region, and
said combining determining step comprises: determining that the query object is detected in the candidate image region in a case where components of more than a predetermined number or more than a predetermined proportion are detected by the plurality of component classifiers and the detected components satisfy the positional relationship therebetween.

15. The object detection method according to claim 11, wherein
the object detecting step further comprises:
a candidate image region updating step of updating, if a predetermined condition is not met, the candidate image region, and performing the candidate image region determining step, the first detecting sub-step and the second detecting sub-step in the updated candidate image region; and
an object locating step of determining, according to the candidate image regions from which the query object is detected, the location of said query object in the destination image.

16. An object detection apparatus comprising:
a general model storing unit configured for storing a general model for a specific object type in advance, the general model describing a plurality of components which are expected to co-exist in objects of the specific object type;
a sample image receiving unit configured for receiving one or more sample images, said one or more sample images each comprises a same query object of the specific object type;
an object detector creating unit configured for creating, using the general model and said one or more sample images, a detector specific to said query object; and
an object detecting unit configured for detecting, using the created detector specific to said query object, said query object from a destination image,
wherein the general model comprises a plurality of classifier groups respectively corresponding to the plurality of components, each of the plurality of classifier groups comprising a plurality of candidate classifiers for describing a plurality of different feature instances of a corresponding component of the specific object type.

17. A non-transitory computer-readable storage medium storing a program for, when loaded to a computer and executed by the computer, causing the computer to execute each step of an object detection method performed by an apparatus which stores a general model for a specific object type in advance, the general model describing a plurality of components which are expected to co-exist in objects of the specific object type, the method comprising:
a sample image receiving step of receiving one or more sample images, said one or more sample images each comprises a same query object of the specific object type;
an object detector creating step of creating, using the general model and said one or more sample images, a detector specific to said query object; and
an object detecting step of detecting, using the created detector specific to said query object, said query object from a destination image,
wherein the general model comprises a plurality of classifier groups respectively corresponding to the plurality of components, each of the plurality of classifier groups comprising a plurality of candidate classifiers for describing a plurality of different feature instances of a corresponding component of the specific object type.

18. An image pickup apparatus comprising:
a photographical optical system;
an imaging unit configured for performing imaging to form an image;
the object detection apparatus according to claims 16, configured for enabling a user to input or select a query object, and to detect the query object in the formed image; and
an imaging control unit configured for performing imaging control according to the detected query object.

19. The image pickup apparatus according to claim 18, wherein
the imaging control comprises increasing a resolution for photographing if the query object is detected.

20. The image pickup apparatus according to claim 18, wherein
the imaging control comprises making the photographic optical system focus on the detected query object if the query object is detected.

21. The image pickup apparatus according to claim 18, wherein the imaging control comprises making the photographic optical system keep tracking the detected query object so that the query object continues being present in the image to be formed, if the query object is detected.

\* \* \* \* \*